April 4, 1967  C. M. GOLD  3,312,889
VOLTAGE CONTROL SYSTEM FOR BATTERY CHARGERS AND THE LIKE
Filed Aug. 6, 1963

INVENTOR.
CHARLES M. GOLD
BY
AGENT.

United States Patent Office 3,312,889
Patented Apr. 4, 1967

3,312,889
VOLTAGE CONTROL SYSTEM FOR BATTERY CHARGERS AND THE LIKE
Charles M. Gold, Franklin Square, N.Y., assignor to Yardney International Corporation, New York, N.Y., a corporation of New York
Filed Aug. 6, 1963, Ser. No. 300,326
9 Claims. (Cl. 320—36)

My present invention relates to a voltage-responsive control system for battery chargers and like devices and, more particularly, to control systems connectable in circuit with a load adapted to develop a variable voltage thereacross and responsive to the development of a voltage in excess of a predetermined magnitude for regulating the means energizing the load.

It is known to provide battery chargers and the like with devices for cutting off the charging current upon attainment of a battery voltage of a predetermined magnitude, usually the voltage at which the battery has reached substantially full charge and above which gassing at the battery electrodes tends to occur. For the most part, these known devices have been provided with voltage-responsive relays whose contacts were connected in series with a source of charging potential and the load or battery for open-circuiting the latter upon attainment of a voltage in excess of this predetermined value. While such devices were rather efficient, they had numerous disadvantages, among which were the expense for a voltage-sensitive relay adapted to operate at a predetermined potential, mechanical disadvantages resulting from deterioration of the contacts, and low mechanical stability with respect to vibration, shock and humidity variations. Thus it has been proposed to provide electronic switching means for battery chargers of this type; electronic switches of the conventional sort were, however, unsatisfactory as a consequence of the fact that they were unable generally to handle relatively large charging currents, were not conveniently resettable, and were, of course, highly expensive and complex.

It is, therefore, the principal object of the present invention to provide a voltage-responsive control system connectable across a load adapted to develop a variable voltage thereacross, which is stable, has the advantage of simplicity and is adapted to withstand vibration, shock, humidity variations and the like.

Another object of this invention is to provide a battery charger having a voltage-responsive control system of this type incorporated therein.

Still another object of this invention is to provide a control system for a battery charged wherein, with relatively simple means, the control or cut-off potential can be varied with ease.

These objects and others which will become apparent hereinafter, are attained, in accordance with the present invention, by providing a voltage-responsive control system which comprises a source of electrical potential connectable across a load while thermally responsive switch means is connected in series with this source and a normally nonconductive solid-state breakdown device is connected across the load in circuit with the thermal element of the switch means, this breakdown device being triggerable upon development of a voltage across that load in excess of a predetermined value for passing an electric current through the thermally sensitive element sufficient to actuate the switch means. Thus an essential feature of the present invention resides in the novel use of a thermally sensitive element which usually serves to control devices wherein high currents are present and open-circuit them upon development of excessively high currents. In the case of a battery charger, however, and other loads adapted to develop, as in the case with a battery, a variable voltage across its terminals and lead to a diminution in the current supplied by the charger, the usual thermally responsive switch device will be unsatisfactory when merely connected in series with the load and the current source. It is a significant aspect of the present invention that a normally nonconductive breakdown device is connected across the load in circuit with the thermal element of the switch means and is triggerable upon attainment of a predetermined potential across the load for conducting a relatively large current through the swith element, thereby activating it and controlling the current applied to the load, e.g. by open circuiting it. In this case the current passed by the breakdown device through the switch element is substantially independent of the current drawn by the load.

In a battery charger, the source of electrical potential can be any direct-current source, such as a full-wave or half-wave rectifier, another battery or a direct-current generator, capable of charging the battery or load with an electric current whose magnitude is below the predetermined magnitude at which the thermal element of the switch means is actuated. The switch means can be a normally closed thermally responsive switch whose thermal element is the usual bimetallic contact member adapted to disengage a manually resettable armature whereupon the resiliency of an auxilliary spring opens the circuit. According to a more particular feature of the invention, the breakdown device is a solid-state electronic component and, preferably, a Zener diode normally poled to prevent shortcircuiting of the source through the switch means but capable of drawing sufficient current to actuate the latter upon development of a breakdown voltage across the load.

According to still another feature of this invention, the breakdown device can work into a transistor connected in circuit with the source and the thermally sensitive element of the switch means, this transistor being normally biassed nonconductive, with the breakdown device so poled as to render the transistor conductive upon breakdown. The switch-opening current thus passes primarily through the transistor which constitutes an auxiliary switch element. It will be readily apparent that this circuit is of great advantage in a battery-charging device since, when the battery is fully charged to a predetermined voltage, the Zener diode will suddenly conduct and cause the thermal switch to snap open, thereby completely decoupling the battery from the charging source and preventing further charging of the battery.

The above and other objects, features and advantages of the present invention will become more readily apparent from the following description, reference being made to the accompanying drawing in which.

Figure 1:
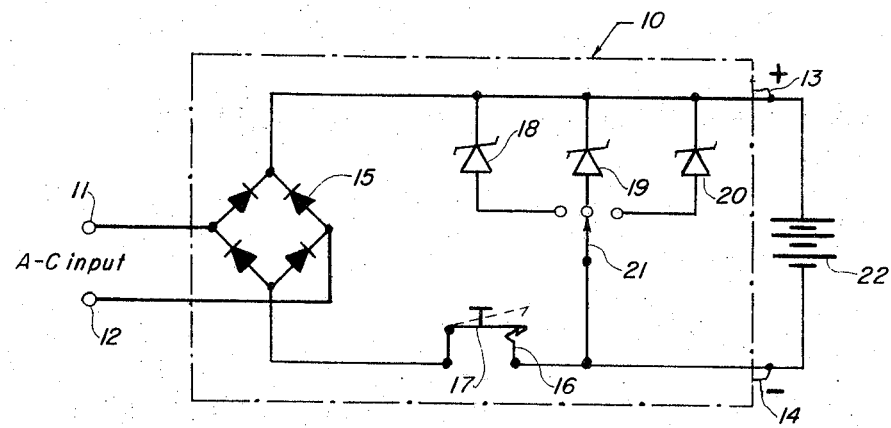
FIG. 1 is a circuit diagram of a voltage-responsive control system for a battery charger according to the present invention.

In FIG. 1 of the drawing, I show a battery charger 10 whose A.-C. input terminals 11, 12 are disposed at one end of a housing shown in dot-dash lines while direct-current output terminals 13, 14 are provided on the opposite end of this housing and are connected with a battery 22 by the usual conductors. The battery charger 10 comprises a rectifier bridge 15 whose direct-current terminals are tied to the battery 22 in series with a thermally sensitive switch 16, 17. This switch has a manually operable contact member 17 in conductive engagement with a bimetallic contact 16, by way of example, although the corresponding elements of conventional thermosensitive switch devices can also be used for the present purpose. A selecting switch 21 is provided to bridge any desired one of a plurality of parallel breakdown devices 18, 19, 20, preferably Zener diodes, across the load 22. The individual Zener diodes 18, 20 each have different breakdown voltages corresponding to the voltage at which the charging for battery 22 is to be cut off. The Zener diodes are poled as to be nonconductive during normal charging operation as will be described hereinafter.

When it is desired to charge battery 22 to, say, a cutoff voltage of 24 volts, the selection switch 21 is rotated to bring into circuit a Zener diode 18–20 whose breakdown voltage corresponds to that of cutoff, in this case, Zener diode 19. With the system in the condition shown in the drawing, battery 22 is charged by a rectifier bridge 15 in the normal manner, drawing a current insufficient to operate the thermally sensitive switch 16, 17. When, however, the voltage rises to the threshold voltage of 24 volts, the Zener diode 19 breaks down to draw a relatively large current through the thermally sensitive element 16 and cause its deflection and the unlatching of member 17, with the consequent open circuiting of battery 22. This immediately terminates the charging operation and permits the battery 22 to be removed and replaced by another battery to be charged. When this is done, member 17 is depressed and again latched by element 16 which has returned to its original position upon cooling. When a higher or lower cutoff voltage is desired, switch 21 connects Zener diodes 18 or 20 in circuit, these diodes having breakdown potentials below and higher than that of Zener diode 19, respectively.

Figure 2:
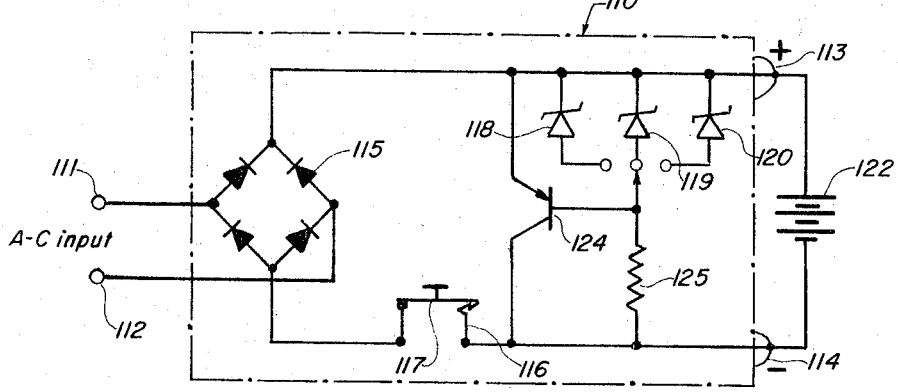
FIG. 2 is a circuit diagram of a modified battery charger.

In the embodiment of FIG. 2, the alternating-current terminals 111, 112 of rectifier bridge 115 may be connected to the usual line voltage, the rectifier bridge 115 being connected in circuit with a thermally responsive switch 116, 117 as previously described. In this case, however, the thermal element 116 is connected in circuit with the rectifier bridge 115 and the emitter/collector terminals of a transistor 124. A biassing resistor 125, which limits the current flow through Zener diodes 118, 119 or 120, is provided in the base/collector circuit of this transistor while a switch 121 can selectively connect one of the Zener diodes 118–120 in the base/emitter circuit of the transistor. A battery 122 is again connected between the D.-C. output terminals 113 of the battery charger 110. When the potential of battery 122 is below the threshold potential, determined by the selected Zener diode 119, transistor 124 is nonconducting so that charging proceeds in the usual manner. When, however, the potential across battery 122 rises above the threshold potential, the Zener diode 119 is triggered to alter the normally blocking bias of the base of the transistor 124 and render the latter conductive, whereupon a large current is drawn through thermally-sensitive ele- alter the normally blocking bias of the base of the transistor 124 and render the latter conductive, whereupon a large current is drawn through thermally-sensitive element 116 to disengage it from element 117 of the switch. When the battery 122 is removed, the manually actuable element 117 can again be restored to its original position in latching engagement with the bimetallic element 116. It should be noted that another breakdown device, such as a Zener diode, can be connected across the load 122 in reverse polarity so as to break down with an increase of, say, a negative potential thereacross to open circuit the charger in the event that the battery 122 or 22 has been connected to the terminals 113, 114 or 13, 14 in the wrong manner and thus prevent reversal of the battery cells. When reference is made herein to a battery, it should be noted that it is intended by this term to include individual electrochemical cells in addition to a multiplicity of them connected in series, in parallel, or in series-parallel combination.

Figure 3:
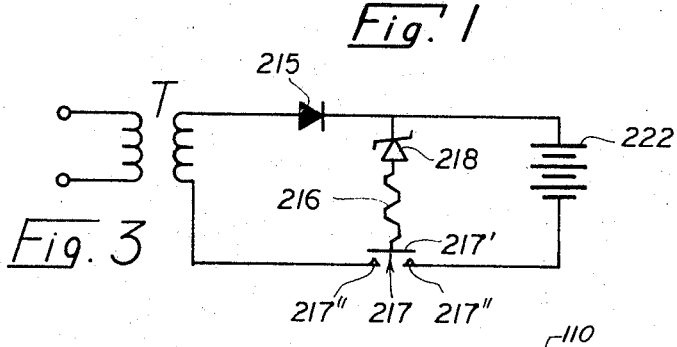
FIG. 3 is a circuit diagram of still another battery-charging system.

In FIG. 3 I show another arrangement wherein a single rectifier 215 is connected in series with the secondary winding of a stepdown transformer T and the battery 222 to be charged while a switch 217, whose armature 217' bridges a pair of contacts 217", is connected in series with the charging network and the battery 222. This thermally sensitive switch is provided with the usual temperature-responsive element, diagrammatically represented at 216, conductively and mechanically tied to armature 217' and connected in series with the voltage-breakdown device (Zener diode 218). In this modification of the control system the charging current does not pass through the temperature-responsive element 216 which is energized only when Zener diode 218 breaks down. Upon breakdown of the Zener device 218, the charging current is diverted through temperature-sensitive element 216 which contracts to draw armature 217' away from both contacts 217" to disconnect the battery 222 from the charging network while simultaneously disconnecting the Zener diode 218 from its condition shunting the battery 222. Armature 217' can be provided with a further set of contacts for operating a pilot lamp as, for example, describer in my copending application Ser. No. 90,360, filed February 20, 1961.

The invention as described and illustrated is believed to admit of many modifications and variations within the ability of persons skilled in the art, all of these modifications and variations being considered within the spirit and scope of the appended claims.

I claim:
1. In a voltage-responsive control system, in combination,
  a source of electrical potential connectable across a load adapted to develop a variable voltage thereacross;
  thermally responsive switch means provided with a thermal element energizable by passage of electric current and connected in series with said source;
  a transistor connected in circuit with said source and said element but normally biassed nonconductive; and
  a normally nonconductive breakdown device connected across said load and in circuit with said transistor while being triggerable upon development of a voltage across said load in excess of a predetermined value for rendering said transistor conductive, thereby passing an electric current through said element sufficient to actuate said switch means.

2. In a voltage-responsive control system, in combination,
  a source of electrical potential connectable across a load adapted to develop a variable voltage thereacross;
  thermally responsive switch means provided with a thermal element energizable by passage of electric current and connected in series with said source;
  a transistor connected in circuit with said source and said element but normally biased nonconductive; and
  a normally nonconductive solid-state electronic breakdown device connected across said load and in circuit with said transistor while being triggerable upon development of a voltage across said load in excess of a predetermined value for rendering said transistor conductive, thereby passing an electric current through said element sufficient to actuate said switch means.

3. In a voltage-responsive control system, in combination,
  a source of unidirectional electrical potential connectable across a load adapted to develop a variable voltage thereacross;
  thermally responsive switch means provided with a thermal element energizable by passage of electric current of a predetermined magnitude and connected in series with said source;
  a transistor connected in circuit with said source and said element but normally biased nonconductive; and a normally nonconductive Zener diode connected across said load and in circuit with said transistor, said Zener diode being triggerable upon development of a voltage across said load in excess of a predetermined value for rendering said transistor conductive, thereby passing an electric current through said element sufficient to actuate said switch means.

4. In a voltage-responsive control system, in combination, a source of unidirectional electrical potential connectable across a load adapted to develop a variable voltage thereacross;

normally closed thermally responsive switch means provided with a thermal element energizable by passage of electric current of a predetermined magnitude and connected in series with said source and said load for supplying an electric current to said load insufficient to actuate said switch means;

a transistor connected in circuit with said source and said element but normally biased nonconductive; and a normally nonconductive Zener diode connected across said load and in circuit with said transistor, said Zener diode being triggerable upon development of a voltage across said load in excess of a predetermined value for rendering said transistor conductive, thereby passing an electric current through said element sufficient to actuate said switch means and disconnect said source from said load.

5. A battery charger, comprising:

a source of direct current connectable across a battery for charging same to a predetermined potential;

normally closed thermally responsive switch means provided with a thermal element energizable by the passage of an electric current of a predetermined magnitude connectable in series with said source and said battery but unenergizable by the charging current supplied to said battery by said source;

a transistor connected in circuit with said source and said element but normally biased nonconductive; and a normally nonconductive electronic breakdown device connected across said battery and in circuit with said transistor while triggerable upon development of a voltage across said battery substantially equal to said predetermined potential for rendering said transistor conductive, thereby passing an electric current through said element sufficient to actuate said switch means and disconnect said source from said battery.

6. A battery charger, comprising:

a source of direct current connectable across a battery for charging same to a predetermined potential;

a normally closed thermally responsive switch means provided with a thermal element energizable by the passage of an electric current of a predetermined magnitude connectable in series with said source and said battery but unenergizable by the charging current supplied to said battery by said source;

a transistor connected in circuit with said source and said element but normally biased nonconductive; and a normally nonconductive Zener diode connected across said battery and in circuit with said transistor, said Zener diode being triggerable upon development of a voltage across said battery substantially equal to said predetermined potential for rendering said transistor conductive, thereby passing an electric current through said element sufficient to actuate said switch means and disconnect said source from said battery.

7. A battery charger, comprising:

a source of direct current connectable across a battery for charging same to a predetermined potential;

a manually resettable normally closed thermally responsive switch provided with a thermal element energizable by the passage of an electric current of a predetermined magnitude connectable in series with said source and said battery but unenergizable by the charging current supplied to said battery by said source;

a transistor connected in circuit with said source and said element but normally biased nonconductive; and a normally nonconductive electronic breakdown device connected across said battery and in circuit with said transistor while being triggerable upon development of a voltage across said battery substantially equal to said predetermined potential for rendering said transistor conductive, thereby passing an electric current through said element sufficient to actuate said switch and disconnect said source from said battery.

8. A battery charger, comprising:

a source of direct current connectable across a battery for charging same to a predetermined potential;

a manually resettable normally closed thermally responsive switch provided with a thermal element energizable by the passage of an electric current of a predetermined magnitude connectable in series with said source and said battery but unenergizable by the charging current supplied to said battery by said source;

a transistor connected in circuit with said source and said element but normally biased nonconductive; and a normally nonconductive Zener diode connected across said battery and in circuit with said transistor, while said Zener diode being triggerable upon development of a voltage across said battery substantially equal to said predetermined potential for rendering said transistor conductive, thereby passing an electric current through said element sufficient to actuate said switch and disconnect said source from said battery.

9. In a voltage-responsive control system, in combination, a source of electrical potential connectable across a load adapted to develop a variable voltage thereacross; thermally responsive switch means provided with a thermal element energizable by passage of electric current, said switch means including a switch armature displaceable by said thermal element for connecting said source in series with said load; a normally nonconductive breakdown device connected across said load in circuit with said element, a transistor normally biased to nonconductive state, connected in circuit with said breakdown device and in series with said element, said transistor being rendered conductive upon triggering of said device, thereby passing an electric current through said element sufficient to cause the latter to displace said armature and disconnect said source from said load.

References Cited by the Examiner

UNITED STATES PATENTS

| | | | |
|---|---|---|---|
| 1,457,863 | 6/1923 | Strawmyer et al. | 320—26 |
| 2,892,127 | 6/1959 | Leonard | 200—116 X |
| 3,062,998 | 11/1962 | Medlar | 320—33 |
| 3,113,255 | 12/1963 | Eberts | 320—36 |
| 3,126,525 | 3/1964 | Schwfenzfeger et al. | 340—173.2 |
| 3,160,805 | 12/1964 | Lawson | 320—39 |
| 3,205,422 | 9/1965 | Gold | 320—39 |

OTHER REFERENCES

Protective Circuit, A. Ruehli, IBM Technical Disclosure Bulletin, vol. 4, No. 9, February 1962.

JOHN F. COUCH, *Primary Examiner.*

LLOYD McCOLLUM, *Examiner.*

S. WEINBERG, *Assistant Examiner.*